United States Patent
Dong et al.

(10) Patent No.: US 12,554,877 B2
(45) Date of Patent: Feb. 17, 2026

(54) CONTEXT-AWARE TEXT SANITIZATION

(71) Applicant: PayPal, Inc., San Jose, CA (US)

(72) Inventors: Yanfei Dong, Singapore (SG); Yuan Deng, Singapore (SG); Soujanya Poria, Singapore (SG)

(73) Assignee: PayPal, Inc., San Jose, CA (US)

( * ) Notice: Subject to any disclaimer, the term of this patent is extended or adjusted under 35 U.S.C. 154(b) by 575 days.

(21) Appl. No.: 18/060,921

(22) Filed: Dec. 1, 2022

(65) Prior Publication Data

US 2024/0184912 A1    Jun. 6, 2024

(51) Int. Cl.
*G06F 21/62* (2013.01)
*G06F 40/284* (2020.01)
*G06F 40/295* (2020.01)

(52) U.S. Cl.
CPC ........ *G06F 21/6245* (2013.01); *G06F 40/284* (2020.01); *G06F 40/295* (2020.01)

(58) Field of Classification Search
None
See application file for complete search history.

(56) References Cited

U.S. PATENT DOCUMENTS

| | | | |
|---|---|---|---|
| 10,803,057 B1 * | 10/2020 | Goodsitt | G06F 16/3329 |
| 11,222,165 B1 * | 1/2022 | Ramos | G06F 40/279 |
| 12,333,246 B1 * | 6/2025 | Gupta | G06N 5/01 |
| 2019/0332658 A1 * | 10/2019 | Heckel | G06N 3/08 |
| 2020/0050966 A1 * | 2/2020 | Enuka | G06Q 10/10 |

OTHER PUBLICATIONS

Shrimal, Anubhav, Avi Jain, Kartik Mehta, and Promod Yenigalla. "NER-MQMRC: formulating named entity recognition as multi question machine reading comprehension." arXiv preprint arXiv:2205. 05904 (2022). (Year: 2022).*
L. Li, X. Huang, J. Ma and Y. Li, "An Enhanced MRC Framework with Triggers as Explanations for Named Entity Recognition," 2022 IEEE 5th Advanced Information Management, Communicates, Electronic and Automation Control Conference (IMCEC), Chongqing, China, 2022, pp. 570-577. (Year: 2022).*

(Continued)

*Primary Examiner* — Frank D Mills
(74) *Attorney, Agent, or Firm* — Kowert, Hood, Munyon, Rankin & Goetzel, P.C.; Dean M. Munyon

(57) ABSTRACT

Techniques are disclosed relating to text sanitization. Given textual data, a computer system identifies tokens predicted to constitute sensitive information. Multi-field data structures (e.g., triplets) are generated for the identified tokens that include questions, answers, and corresponding context. These data structures are supplied to a pre-trained multiple-choice question (MCQ) reading comprehension model. The model outputs, for each data structure, a probability that the question and answer for a given data structure, provided the context, is accurate. A post-processing module can then rank probabilities in this set of probabilities and select the multi-field data structure with the highest probability (in some cases, a programmable threshold must also be met). The selected multi-field data structure is then used to select category information to be used in sanitizing the textual data. In this manner, a piece of sensitive data may be replaced by a label that helps retain interpretability of the sanitized text.

20 Claims, 5 Drawing Sheets

(56) References Cited

OTHER PUBLICATIONS

Davody, Ali, David Ifeoluwa Adelani, Thomas Kleinbauer, and Dietrich Klakow. "TOKEN is a MASK: Few-shot Named Entity Recognition with Pre-trained Language Models." arXiv preprint arXiv:2206.07841 (2022). (Year: 2022).*

Xiaoya Li, "A Unified MRC Framework for Named Entity Recognition," Department of Computer Science and Technology, Zhejiang University, retrieved Nov. 22, 2022, 11 pages.

Diego Molla et al., Proceedings of the 2006 Australasian Language Technology Workshop (ALTW2006), "Named Entity Recognition for Question Answering," pp. 51-58, Sydney, Australia.

Damien Teney et al., "Zero-Shot Visual Question Answering," pp. 1-18, Australian Centre for Visual Technologies, The University of Adelaide.

* cited by examiner

CONTEXT-AWARE TEXT SANITIZATION

BACKGROUND

Technical Field

This disclosure relates generally to text processing, and, more specifically, to techniques for context-aware text sanitization.

Description of the Related Art

Companies routinely handle and store content, including user-generated content, and may communicate such information over various online platforms. For example, textual data may be provided by a user in a customer service context such as over a voice transcript, a chat bot, etc. Similarly, textual data may be communicated between users over an online medium hosted by a company, such as a peer-to-peer chat, emails, etc. In these scenarios, the textual data may include sensitive information that a company may wish to protect based on an internal policy. In some cases, special handling may be required due to legal or regulatory requirements. Thus, it may be desirable or even required for companies to sanitize sensitive information from textual data.

Handling policies may stipulate which classes of data can be stored, how different classes of data must be stored, how different classes of data can be transmitted, etc. There are many different types of data classifications relating to handling requirements. As one example, a handling policy may stipulate that certain textual data such as a card verification value on a credit card is not allowed to be stored at all, while other textual data such as a social security number is required to be encrypted to be stored or transmitted. Accordingly, if a user creates textual data for types of data having a sufficiently high level of sensitivity, it may be desirable or even legally necessary for companies to perform text sanitization.

Even after text sanitization is performed, individuals at a company may need to read the sanitized text. Consider a customer service request in which a user includes sensitive information. After the text is sanitized, a customer service representative for a company will generally need to review the request which now includes the sanitized data, in order to satisfy the customer's inquiry.

DETAILED DESCRIPTION

Figure 1:
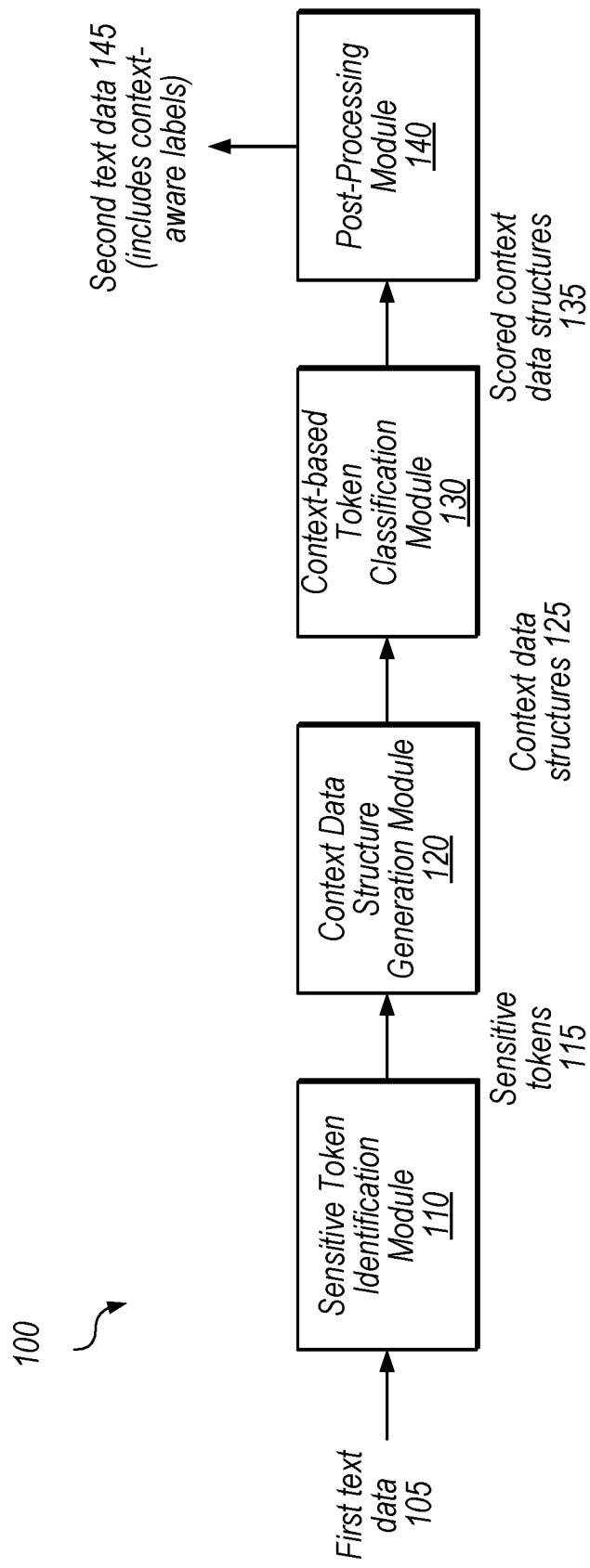
FIG. 1 is a block diagram illustrating one embodiment of a text sanitization pipeline.

Traditional text sanitization techniques, such as regular expression (regex) processing, can be used to perform text sanitization. Regex-based text sanitization, however, is known to encounter various problems, including high false positives, the inability to detect slightly changed text, and the inability to detect granular data types. As one example, regex-based techniques may incorrectly classify and sanitize non-sensitive year data (e.g., the year 2020) under a regex for the last 4 digits of a credit card. As another example, regex-based techniques may be unable to detect slight changes in text, such as a passport number that is written with a space separator (e.g., G3627 4389), and consequently fail to mask such sensitive information. Regex-based techniques may further fail to capture non-alphanumeric data types (e.g., data types that are not numbers or alphabetic characters). Lastly, the binary nature of regex-based techniques generally results in textual data falling into one of two types (e.g., sensitive or non-sensitive), meaning that sanitized text often omits context and may become difficult to interpret when reviewed by an individual at a later time. For example, a textual passage with lots of sensitive material may be difficult to read if each of many different items of sensitive data are all replaced with the label <sensitive> or <sens>.

The inventors have recognized that the downfalls discussed above may be addressed with alternative methods that mask sensitive information with labels that provide information that permits a reviewer of the sanitized textual data to retain context pertaining to the original textual data.

In contrast to traditional techniques, disclosed embodiments generate context-aware sanitized text using a multiple-choice question reading comprehension model. Various modules, including those that perform named entity recognition and question-answer generation, generate a set of multi-field data structures that include context, question, and answer information for tokens of input text and are usable to mask sensitive information with context-based labels. (In some implementations, the multi-field data structure can be referred to as a context-question-answer triplet, but the term "multi-field data structure" is used to indicate that the data structure can include additional values without departing from the spirit of the disclosed embodiments.) The reading comprehension model outputs a set of probabilities corresponding to the set of multi-field data structures, and in response to the highest probability in the set of probabilities meeting a threshold, identified sensitive information is masked with context-aware category information. Alternatively, if none of the multi-field data structures meet the probability threshold, the identified sensitive information may not be masked.

The disclosed techniques use context-aware identifiers to advantageously mask sensitive information while retaining the interpretability of the original text. For example, traditional binary masking may produce "The card info is <sensitive><sensitive><sensitive>" as sanitized text, while context-aware masking might produce "The card info is <PAN Number><expiry date><cvv>."

Text Sanitization Pipeline

FIG. 1 is a block diagram illustrating one embodiment of a text sanitization pipeline 100. As shown, pipeline 100 includes sensitive token identification module 110, context data structure generation module 120, context-based token classification module 130, and post-processing module 140. Generally speaking, pipeline 100 is operable to receive first text data 105 and output sanitized second text data 145, which includes context-aware labels in place of sensitive text.

Sensitive token identification module 110, in the illustrated embodiment, is operable to identify sensitive tokens within textual data that are predicted to correspond to sensitive data. (As will be described below with reference to module 140, a prediction that a token corresponds to sensitive data does not mean that the token will necessarily be masked when generating output text. In some cases, a prediction that a token corresponds to sensitive data may be incorrect; in such cases, the token will not be masked.) As shown, module 110 receives, as input, first text data 105 that includes sensitive information. In some embodiments, module 110, prior to identifying sensitive tokens that are predicted to correspond to sensitive data, tokenizes (e.g., using a tokenizer module) first text data 105 into a plurality of tokens. In other embodiments, module 110 receives tokens from a tokenizer module (not shown) that takes first text data 105 as input. Module 110 is operable to predict whether each received token includes sensitive data. In many cases, this functionality may be performed by various machine learning techniques. As one example, named entity recognition (NER), which is a type of task that may be implemented in any number of ways (e.g., BERT-based, ROBERTa-based, etc.), is performed to identify sensitive data as described below with respect to FIG. 2. Module 110 provides identified sensitive tokens 115 to module 120. In some implementations, each token analyzed by module 110 might include a flag variable indicating whether the token is predicted to include sensitive information.

Context data structure generation module 120, in the illustrated embodiment, is operable to generate a set of context data structures for each token in the plurality of tokens that has been identified as sensitive. As used herein, a "context data structure" for a particular token refers to any data structure that includes information about the context of the particular token within first text data 105. "Context," "context data," or "context information" refers to any type or class of data that provides further insight into what type of information a particular token is conveying. In many cases, context is extracted from textual data that surrounds a particular token—for example, some number of tokens around the particular token in question. In other cases, context may be taken from any body of text and may be used to provide further information about a particular token. In any event, pipeline 100 will use some specified definition of context to predict the correct category for a token.

One type of context data structure is a context-question-answer triplet. More generally, a context data structure may be referred to as a multi-field data structure in which one of the fields includes context information. One common type of context information is text that surrounds the particular token. Module 120 is operable to generate context data structures 125, which are conveyed to context-based token classification module 130. Context data structures can be generated through techniques such as question templates or neural question generation models.

Context-based token classification module 130, in the illustrated embodiment, is operable to assess (e.g., score) the set of context data structures. In some embodiments, module 130 receives, as input, the set of context data structures and generates a corresponding set of scores using a different set of machine learning techniques than were used by module 110. One approach is the use of a multiple-choice question (MCQ) reading comprehension model. In some embodiments, the score for a data structure is a numeric value indicative of the predicted accuracy of the data structure's assessment of the nature of the particular token to which the data structure corresponds. For example, suppose a given data structure includes information indicating that the particular token is a CVV for a credit card. The "score" for that data structure might be a probability that the data structure's prediction (which is based on the included context information) is correct. In other embodiments, the score might be a binary flag, a value on a defined scale (0-10), etc. As will be described, multiple different context data structures can be generated for a single token. Accordingly, module 130 will commonly output multiple scored context data structures 135 for a given token.

Post-processing module 140, in the illustrated embodiment, is operable to generate second text data 145 that includes context-aware labels for masking sensitive information. Generally speaking, module 140 may use the scores for all the data structures corresponding to a given token to determine whether that token should be masked, and if so, how that token should be masked. For example, for an exemplary numeric token 123456987, pipeline 100 might produce a first context data structure indicating that the token is a bank account number, and a second context data structure indicating that the token is a passport number. Suppose module 130 assigns a 67% probability and a 76% probability to the first and second context data structures, respectively. In some embodiments, module 140 is operable to identify the highest scored context data structure in the set of scored context data structures for a particular token, meaning that the token would be characterized as a passport number since the second probability is greater than the first. Module 140 can then use this information to select a "mask," "label" or "category" for the token. Module 140 may thus replace 123456987 with the label <passport number> in second text data 145 instead of the label <bank account number>. The use of this label sanitizes the text but still allows a reader of the sanitized text to retain some measure of interpretability.

In some embodiments, the score for the selected data structure may also need to exceed some specified threshold in order to determine whether the prediction made by module 110 is correct, and before assigning a particular label. As one example, suppose the specified threshold is 50% and module 130 assigns a 37% probability and a 46% probability to first and second context data structures, respectively. In this situation, module 140 can determine that neither data structure has a sufficiently high probability of being sensitive, and thus that the original prediction of sensitivity made by module 110 is incorrect. As a result of this determination, no context data structure is selected by module 140 and the token in question appears, unmasked, in the output text data. As another example, suppose the specified threshold is 70% and module 130 assigns a 67% probability and a 76% probability to first and second context data structures, respectively. In this situation, module 140 will use information in the second context data structure to perform masking; the first context data structure does not have a probability over the specified threshold.

Example Text Sanitization Pipeline

Figure 2:
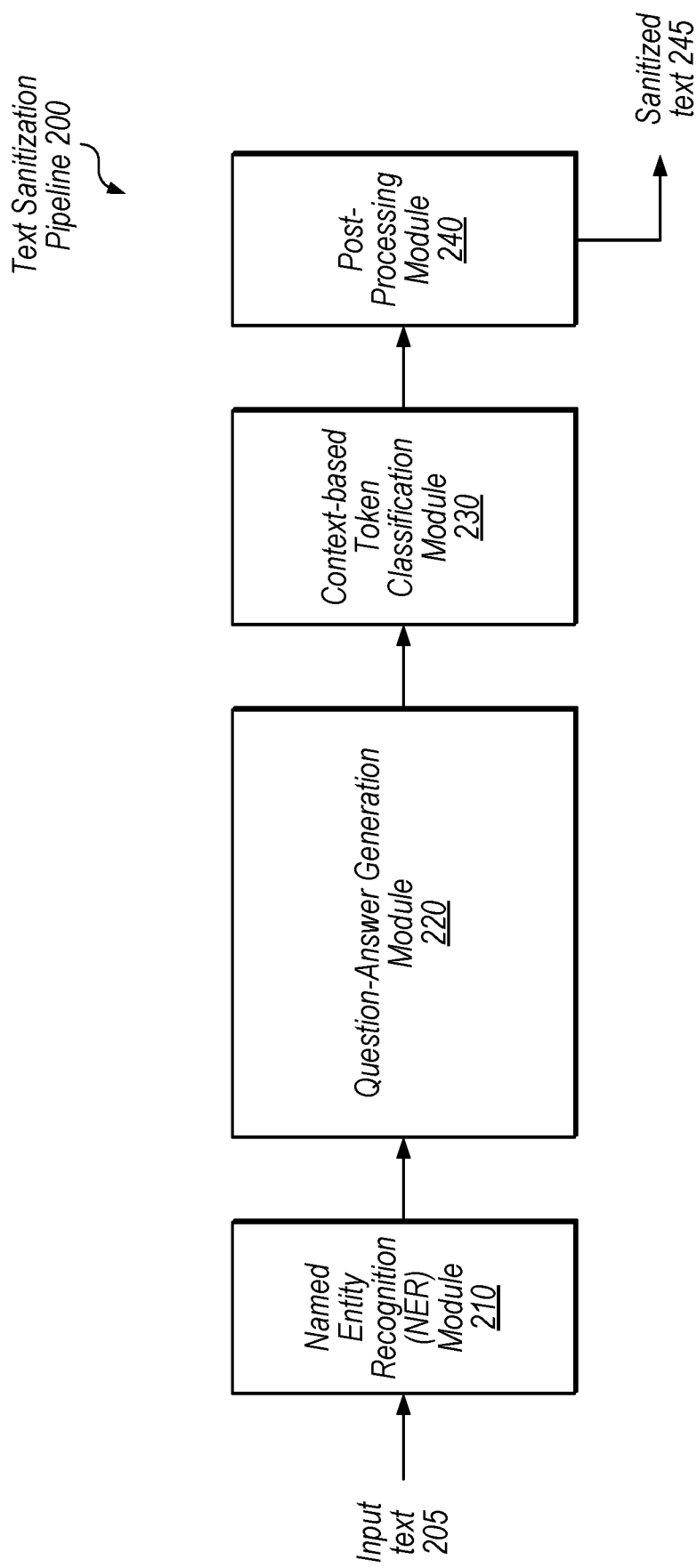
FIG. 2 is a block diagram illustrating one embodiment of a more specific text sanitization pipeline, relative to that shown in FIG. 1.

FIG. 2 is a block diagram illustrating one embodiment of a more specific text sanitization pipeline, relative to that shown in FIG. 1. The illustrated embodiment includes text sanitization pipeline 200, which is operable to generate sanitized text from input text. Pipeline 200 includes named entity recognition (NER) module 210 (a more specific version of module 110 in FIG. 1), question-answer generation module 220 (a more specific version of module 120 in FIG. 1), context-based token classification module 230 (also shown in FIG. 1), and post-processing module 240 (also shown in FIG. 1).

In this disclosure, various modules operable to perform designated functions are shown in the figures and described in detail below (e.g., named entity recognition (NER) module 210, question-answer generation module 220, context-based token classification module 230, post-processing module 240, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

"Sensitive data" refers to any type or class of data for which there are additional restrictions on handling relative to non-sensitive data. Sensitive data can commonly include personally identifying data for a user (e.g., Social Security Number, passport number, driver's license number), financial information for a user (e.g., bank account number, credit card number), health information for a user, confidential data about a company, etc. In many cases, sensitive data may be specified by privacy laws such as the EU's General Data Protection Regulation (GDPR), California's Consumer Privacy Act (CCPA), etc. In other cases, sensitive data may be defined by industry standards. Still further, sensitive data may be set on an entity-by-entity basis. That is, one entity may define sensitive data differently than another entity. To this end, pipeline 200 will use some specified definition of sensitive data to identify and mask such data.

Named entity recognition (NER) module 210 is operable to perform named entity recognition and identify sensitive tokens within textual data that are predicted to correspond to sensitive data. In some embodiments, input text 205 is received from at least one of the following sources of text data: a customer service live chat, a peer-to-peer chat, a voice transcript, and email data. For example, input text may be from a customer service live chat (e.g., a chat bot) that represents communications between a customer-service representative of a company and a customer (e.g., because of an issue a customer is experiencing with a product/service, a customer seeking information about a product/service, etc.).

A "token" refers to an individual word or term in textual data. One or more tokens may be generated through a tokenization process in which input text is split into individual words or terms. A token may be alphanumeric (containing letters, numerals, or both—for example "john3734") or non-alphanumeric (not containing letters or numerals—for example, "@=+").

Named entity recognition (NER) is a machine learning technique in the subfield of natural language processing (NLP) that identifies and categorizes key information (entities) within unstructured text. An entity can be any word or series of words that consistently refers to the same information. Using NER, detected entities are classified into predetermined categories (e.g., company, location, person name, etc.). As one example, an NER machine learning model may identify the word "super. AI" in text and classify it as a "company."

NER module 210, in the illustrated embodiment, performs named entity recognition on a set of tokens generated from input text 205 according to the process described above. In some embodiments, NER module 210 accesses a configuration file to determine which predetermined categories are sensitive and which categories are non-sensitive, before identifying sensitive tokens that are predicted to correspond to sensitive data. In some cases, NER module 210 may communicate with a cloud-based server to determine which categories are sensitive and non-sensitive. Suppose a given token is classified in the predefined category "financial information;" where the "financial information" category is assigned a sensitive classification within a configuration file. In this scenario, the given token would be predicted to correspond to sensitive data. Note that for different instances of pipeline 200, categories may be classified for sensitivity in different manners. Thus, in one instance of pipeline 200, a token classified in a particular category may be predicted to constitute sensitive data, while in another instance, a different token classified into the same particular category may not be said to be predicted to constitute sensitive data.

In some embodiments, NER module 210 implements one or more binary NER models to perform NER. For example, in some embodiments, NER module 210 implements a first binary NER model (not shown) for performing NER for alphanumeric tokens in the set of tokens, in addition to a second binary NER model (not shown) for performing NER for non-alphanumeric tokens in the set of tokens. Using separate NER models to perform NER for alphanumeric tokens and non-alphanumeric tokens may advantageously increase performance relative to techniques that utilize a single NER model. In other embodiments, a single binary NER model performs NER for both alphanumeric tokens and non-alphanumeric tokens in the set of tokens.

In the illustrated embodiment, NER module 210 generates a binary prediction of whether individual tokens are predicted to correspond to sensitive data. For example, tokens that are predicted to contain sensitive information may be identified with a "1" or any other tag that indicates sensitivity, such as "<sens>," "sensitive," etc. Similarly, tokens that are predicted to be non-sensitive may be identified with a "0" or any other tag that indicates non-sensitivity. NER module 210 outputs, to question-answer generation module 220, those tokens in the set of tokens that have been predicted as sensitive.

Certain machine or deep learning models are able to answer questions given some context, and sometimes without any context. They can extract answer phrases from paragraphs, paraphrase the answer generatively, or choose one option out of a list of given options, etc. It all depends on the dataset it was trained on or the problem it was trained for, or to some extent the neural network architecture. So, for example, if this paragraph is supplied to a model trained to extract answer phrases from context and the model is asked a question such as "What is a question-answering model?", the model should output the first line of this paragraph. In general, question generation aims to automatically create questions for a set of tokens so that the corresponding answers can provide further information about what a particular token is or contains (e.g., person's name, organization name, location, bank information, etc.).

Question-answer generation module 220, in the illustrated embodiment, is thus operable to generate, for the set of tokens identified as sensitive, questions and corresponding answers, which may be referred to as question-answer pairs. In some embodiments, module 220 first generates questions for the set of tokens, and subsequently generates corresponding answers.

Module 220 can perform question generation in different ways, including using question templates and using neural question generation. Question templates are a set of predefined questions. In many cases, a variety of similar questions may be generated, all of which have the same premise. In such situations, the response to these questions may be the same or similar. For example, a first question template may be "Which type is Australia?" whereas a second, different question template may be "What type is Australia?" The answer to these two questions may both be "country," "location," etc. Accordingly, the answer to both questions can be identical despite the two questions being phrased differently.

In some embodiments, neural question generation (NQG) generates questions based on provided passages using neural networks (e.g., deep neural networks, recurrent neural networks, etc.). Consider, for example, the following passage: "John Francis O'Hara was elected president of Notre Dame in 1934." In response, NQG may generate the following question: "Who was elected John Francis?" As can be seen, this question is invalid; NQG may generate invalid questions when the passage includes words from the answer (e.g., "John Francis O'Hara"). In contrast, consider, for example, the following masked passage: "<a> was elected president of Notre Dame in 1934." For this passage, NQG generates the following question: "Who was elected president of Notre Dame in 1934?" A masked passage (i.e., one that does not include words from the answer) prevents the answer words from appearing in the question, resulting in the generation of desired questions. A neural question generation model will generate different questions due to different random seeds being used.

In some situations, when a more diverse set of questions is desired, NQG may be used over question templates given that NQG generates different questions using different random seeds. In some embodiments, NQG utilizes prompt-based methods to generate questions. Prompt-based methods utilize language models that model the probability of text directly; the original input text is modified using a template to generate a textual string prompt that has some unfilled information, and the language model is used to probabilistically fill the unfilled information to obtain a final string, from which an output can be derived.

Module 220 also performs answer generation for the set of questions to generate a set of question-answer pairs. In some embodiments, this process includes enumerating a set of answers for the set of questions to generate the set of question-answer pairs. Thus, multiple question-answer pair combinations for a given token exist. For some tokens, the information at hand can be used to limit the number of question-answer pairs that need to be generated. For example, if it is known that the token is a numeric value, this may mean that question-answer pairs that point to non-numeric values do not need to be generated.

In the illustrated embodiment, context information is included in (e.g., concatenated to) the set of question-answer pairs to generate a set of multi-field data structures that include the context, question, and answer information. Context concatenation and multi-field data structures are discussed in further detail below, with respect to FIGS. 3A and 4. These multi-field data structures are then conveyed to context-based token classification module 230.

Context-based token classification module 230, in the illustrated embodiment, is configured to generate a set of probabilities corresponding to the set of multi-field data structures usable to generate sanitized text. For example, given a data structure corresponding to the question "What type of data is 9154?," the answer "last four digits of credit card information," and surrounding context, module 230 outputs a probability that the answer is correct. In some embodiments, module 230 is implemented using a pre-trained multiple-choice question (MCQ) reading comprehension model. In some embodiments, the pre-trained language model has been trained on an extensive set of documents with varying data types. In some embodiments, the pre-trained language model is a transformer-based neural network that consists of multiple layers, including various attention mechanisms. In other embodiments, the pre-trained language model includes recurrent or convolutional neural networks (e.g., that utilize an encoder-decoder architecture). In some embodiments, the pre-trained language model is publicly available (e.g., BERT. ROBERTa, DeBERTa, T5, GPT, etc.) and pre-trained on one or more datasets (e.g., BookCorpus, Wikipedia, OpenWebText, Stories, etc.).

Accordingly, a given probability in the set of probabilities indicates the likelihood that a given multi-field data structure's answer matches the data structure's question, given surrounding context. Thus, even though the overall objective of module 230 is a multi-class classification (i.e., determining which of multiple categories a given piece of sensitive data belongs to), for a given multi-field data structure, the probability is indicative of a binary determination for one particular question. Multi-class text sanitization has several challenges: some non-alphanumeric data types (e.g., ethnicity, sexual orientation, etc.) require common-sense knowledge, some data types look very similar and require understanding of context to distinguish (e.g., credit card labels from different entities), and the majority of training data is often concentrated on only a few data types. The approach proposed by the inventors reduces the complexity associated with a multi-class classification while advantageously reducing false classifications due to insufficient training data for certain data types by using context information.

As shown, context-based token classification module 230 outputs the set of probabilities to post-processing module 240. In some embodiments, post-processing module 240 ranks the probabilities in the set of probabilities to identify whether that token should be masked, and if so, selects the multi-field data structure with the highest probability. Post-processing module 240, in the illustrated embodiment, is operable to generate sanitized text based on the set of probabilities corresponding to the set of multi-field data structures.

In some embodiments, in response to the multi-field data structure with the highest probability also meeting a programmable probability threshold, module 240 uses the multi-field data structure to generate the sanitized text. The probability threshold may represent a value that is sufficiently large to ensure that it is more likely than not that the condition being evaluated is true (e.g., 75% in some cases).

In some embodiments, module 240 generates the sanitized text 245 by masking sensitive predicted tokens in the input text 205 using category information corresponding to the multi-field data structure with the highest probability. "Category information" refers to a classification of a particular token into some taxonomy—e.g., "bank account," "credit card account," etc. The category information for a particular token may be used to select a mask value or label that is used as replacement for the sensitive token in the output text. Consider the following passage: "The card info is 7879, 07/20, 508." In this example, a binary masking might produce the following sanitized text: "The card info is <sensitive>, <sensitive>, <sensitive>"). The <sensitive> labels here provide no information to a user as to the nature of the sensitive data. The user may not, for example, even be able to identify that the text relates to credit card information. In comparison, a context-aware masking that uses category information (e.g., context-aware category information) may produce the following sanitized text: "The card info is <PAN Number>, <expiry date>, <cvv>." Based on the provided masks, a user is able to identify that the text is related to credit card information. Module 240 therefore outputs the sanitized text, where the identified sensitive information has been masked with labels based on context-aware category information.

Detailed Context-Aware Text Sanitization Pipeline

Figure 3A:
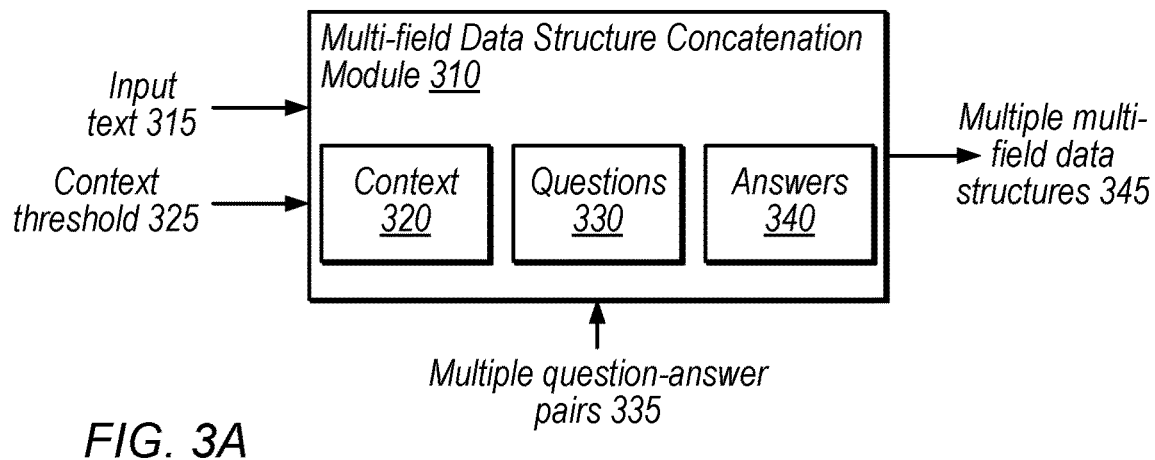
FIG. 3A is a block diagram illustrating one embodiment of a multi-field data structure concatenation module.

FIG. 3A is a block diagram illustrating one embodiment of a multi-field data structure concatenation module. Module 310, in some embodiments, could operate on the outputs of question-answer generation module 220 to provide inputs to context-based token classification module 230. As shown, module 310 includes context information 320, question information 330, and answer information 340. Multi-field data structure concatenation module 310 may be situated in different locations in other embodiments—for example, at the output of module 220 or the input of module 230.

Multi-field data structure concatenation module 310, in the illustrated embodiment, is operable to generate multi-field data structures that include context, question, and answer information. In some embodiments, module 310 generates multiple multi-field data structures 345 for identified sensitive tokens by concatenating context information to multiple question-answer pairs 335 received from module 220 based on a received context threshold 325 and input text 315. In some embodiments, the multiple multi-field data structures 345 include other information (not shown) such as class information, separators between successive elements of information, etc. Class information (e.g., represented as a [CLS] token in the data structure) represents a relevance between a question and corresponding answer, given the context. The class information may be updated, via training of model 350 (FIG. 3B), to reflect the most recent relevance (e.g., based on training using previously predicted sensitive tokens and masks) of the question and corresponding answer, given the context. Separators (e.g., represented as [SEP] tokens in the data structure) between successive elements of information separate the context, question, and answer information. As one non-limiting example, a multi-field data structure in the multiple multi-field data structures 345 may be represented in the following manner: "[CLS] context information 320 [SEP] question information 330 [SEP] answer information 340."

In some embodiments, the context threshold specifies the number of tokens before and after the target token (e.g., a "<sen>" token) that are to be extracted from input text 315 to form the context. As one non-limiting example, the input text provided may be "I'm having problems with adding bank accounts. I want to add 1234567 but it keeps failing. Can you help investigate?" with the target token (e.g., the predicted-sensitive token) being "1234567," and the context threshold provided set to 6 (indicating 6 tokens before and after the target token). Thus, in this example, the extracted context for the target token would be: "bank accounts I want to add but it keeps failing Can you." Note that context threshold 325 can be programmable and thus can be set to different values for different sets of input text, for different applications, etc.

In some embodiments, the extracted context information is concatenated to each of the question-answer pairs to form the set of multi-field data structures, such that context information 320 appears at the beginning of each data structure, followed by a question 330 and corresponding answer 340. In other embodiments, context information 320 may be concatenated in any number of ways such as included in between a question 330 and corresponding answer 340, or after the question-answer pair, for example.

Figure 3B:
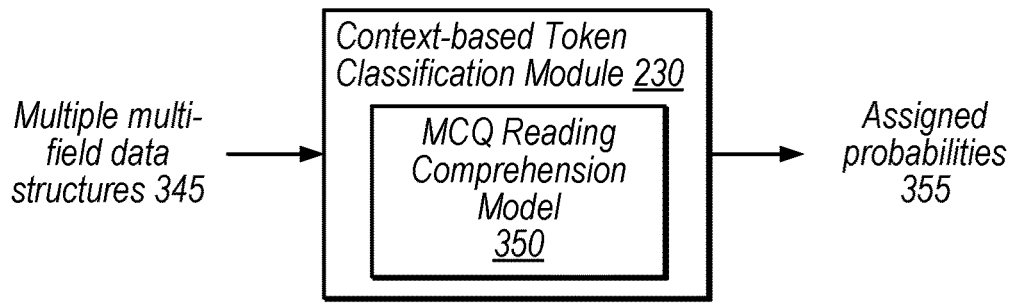
FIG. 3B is a block diagram illustrating one embodiment of a detailed context-based token classification module.

FIG. 3B is a block diagram illustrating one embodiment of a detailed context-based token classification module 230. As shown, module 230 includes MCQ reading comprehension model 350. Context-based token classification module 230, in the illustrated embodiment, is operable to generate a set of probabilities corresponding to the set of multi-field data structures. In some embodiments, module 230 implements MCQ reading comprehension model 350 to generate the set of probabilities.

In some embodiments, model 350 is a pre-trained language model that is finetuned on an extensive set of text documents that provide real-world examples and comparison to the context, question, and answer information included in the multi-field data structures generated by module 310. Model 350 receives, as input, multiple multi-field data structures 345 and generates probabilities 355 for each of the multi-field data structures 345, where a given probability in the set of probabilities indicates the likelihood that a given multi-field data structure's answer matches the data structure's question, given surrounding context. Thus, even though the overall objective is a multi-class classification (i.e., determining which of multiple categories a given piece of sensitive data belongs to), for a given multi-field data structure, the probability is indicative of a binary determination for one particular question. In some embodiments, model 350 can add an assigned probability to each multi-field data structure 345. In other embodiments, an assigned probability 355 is otherwise associated with a given multi-field data structure 345. In any event, model 350 outputs multi-field data structures 345 and assigned probabilities 355.

Figure 3C:
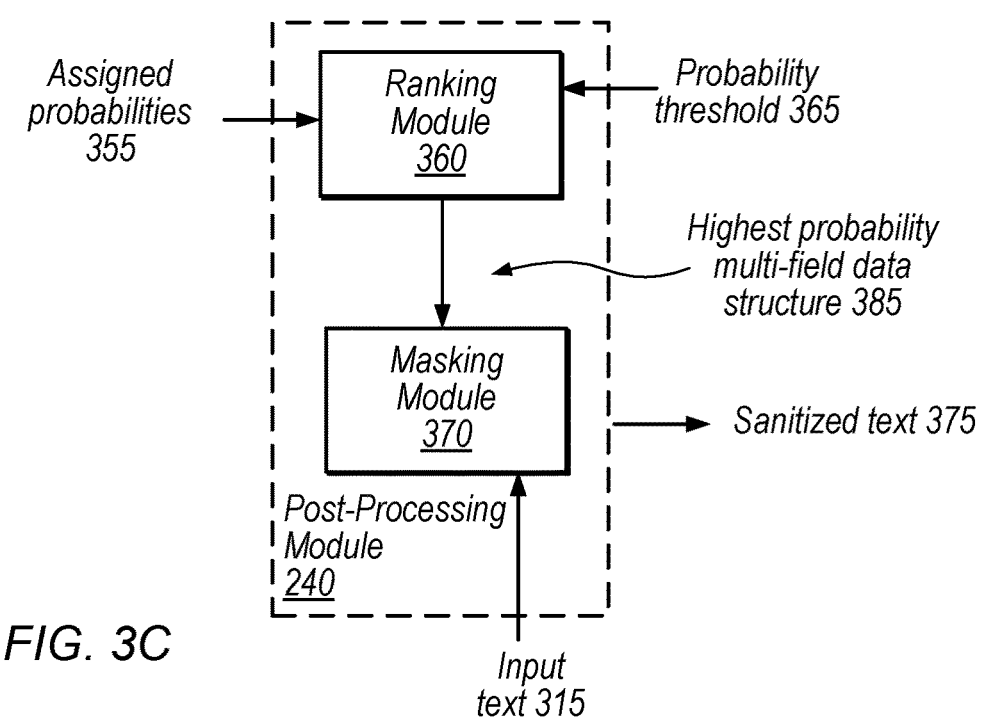
FIG. 3C is a block diagram illustrating one embodiment of a post-processing module.

FIG. 3C is a block diagram illustrating one embodiment of post-processing module 240, previously described with respect to FIG. 2. As shown, module 240 includes ranking module 360 and masking module 370. Module 240 is operable to generate sanitized text based on ranking and masking operations performed by ranking module 360 and masking module 370, respectively.

Ranking module 360 is operable to rank the set of probabilities 355 to identify the multi-field data structure with the highest probability in the set of multi-field data structures 345 that are conveyed to module 240. In some embodiments, module 360 also receives a programmable probability threshold 365. Threshold 365 can be used to specify that the highest-ranked probability must also meet some minimum value. Suppose that the set of probabilities 355 for three different multi-field data structures are 15%, 20%, and 25%, respectively. Module 360 will operate to select the multi-field data structure with the 25% probability. But such a low probability may not be deemed trustworthy enough to confidently classify the token in question. Threshold 365 can specify a minimum probability that must also be met in order to assign a context-aware label to a token. For example, if threshold 365 is 75%, the 25% probability would fail to meet that. If the highest-ranked probability 355 meets or exceeds threshold 365, module 360 outputs, in some embodiments, the corresponding multi-field data structure (e.g., highest probability multi-field data structure 385) (or some portion thereof) to masking module 370. If, however, the highest-ranked probability 355 does not meet threshold 365, module 360 can output, in some embodiments, an indication that the threshold was not met.

Masking module 370 is operable to sanitize input text 315 based on the output of ranking module 360. If the probability of the highest probability data structure 385 meets or exceeds threshold 365, module 370 uses information in that data structure in order to generate an appropriate label for inclusion in sanitized text 375. For example, if the highest probability data structure 385 (i.e., the highest ranked) includes the question "What type of data is 367?" and the answer "CVV data," module 370 might output the label <CVV data> as part of sanitized text 375. In other instances, an answer might be used to index into a table with category information that outputs an appropriate label. In still other embodiments, the answer and some aspect of the token itself (e.g., its length) might be used as inputs into a set of rules that generates a label. For example, an answer field within data structure 385 might specify that the token is a credit card number, while a rule set might use attributes of the token itself to determine the issuer of the credit card-perhaps producing the label <VISA credit card number>. In general, any information in the pipeline may be used to help select an appropriate label for inclusion in sanitized text 375.

If the probability of the highest-ranked data structure does not meet threshold 365, masking module 370 can act in different ways in different embodiments. In some embodiments, module 370 can assign a generic label such as <sensitive data> or <sensitive data-unknown type>. In other embodiments, module 370 can pass through the original token in the output text rather than assigning a label.

Text Sanitization Example

Figure 4:
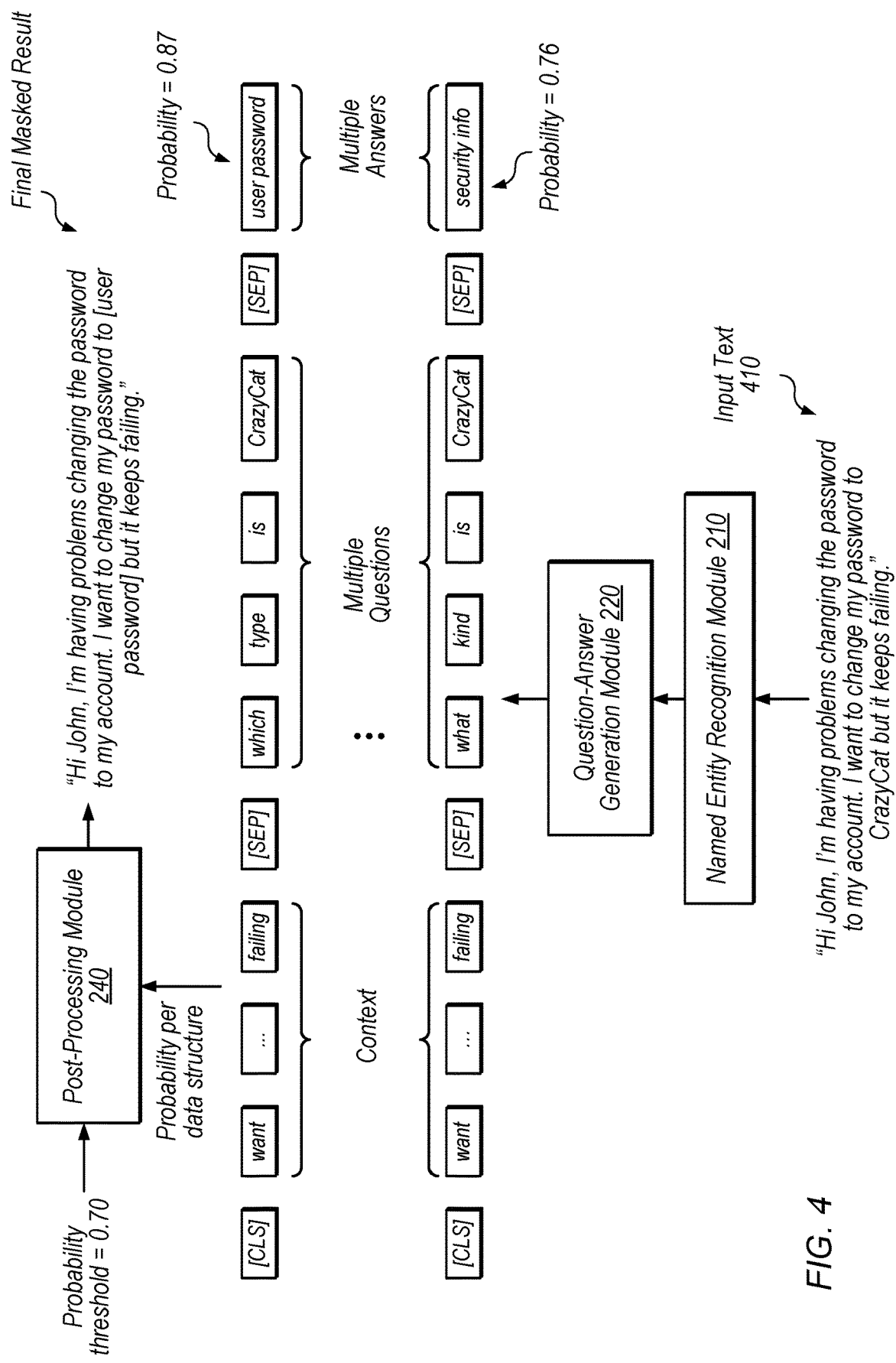
FIG. 4 is a diagram illustrating one example of performing text sanitization.

FIG. 4 is a diagram illustrating one example of performing text sanitization. The example illustrates input text containing sensitive information passing through a text sanitization pipeline such as those described above to produce context-aware sanitized text.

In the example, input text 410, tokenized as individual words, is received at NER module 210 where binary prediction is first performed to identify which tokens are sensitive and which tokens are non-sensitive. Suppose that module 210 identifies the token "CrazyCat" as sensitive; this information is passed to question-answer generation module 220, which generates a set of questions and corresponding answers (question-answer pairs). As one example, the question "what kind is CrazyCat" may be generated, along with the corresponding answer "security info." Similarly, the question "which type is CrazyCat" may be generated, along with the corresponding answer "user password." Multiple other question-answer pairs may be generated.

Context information can be included with each of the question-answer pairs to generate a set of multi-field data structures that include context, question, and answer information. In other embodiments, the multi-field data structures may include any other relevant information in addition to the context, question, and answer information. The other relevant information may include class information, separators between successive elements of information, etc. Class information, represented by the [CLS] token in the illustrated embodiment, represents a relevance between a question and corresponding answer, given the context. The class information may be updated, via training of a model, to reflect the most recent relevance (e.g., based on training using known data) of the question and corresponding answer, given the context. Separators, represented by [SEP] tokens in the illustrated embodiment, that appear between successive elements of information separate the context, question, and answer information.

In some implementations, a programmable context threshold specifies a number of tokens before and after the target token that are to be extracted from the input text to form the context. While two multi-field data structures are illustrated, any number of data structures may be generated based on the number of generated question-answer pairs. In FIG. 4, the context information for these data structures is "want to change my password to" (the six tokens that precede "CrazyCat") and "but it keeps failing" (the remaining four tokens after "CrazyCat" since there are not six tokens).

Subsequently, the set of multi-field data structures are passed through a context-based token classification module (e.g., module 230) to generate a set of probabilities corresponding to the set of data structures. As discussed above, a given probability, corresponding to a given data structure, indicates the likelihood that a given multi-field data structure's answer accurately responds to the data structure's question, given surrounding context. Thus, even though the overall objective of module 230 is a multi-class classification (i.e., determining which of multiple categories a given piece of sensitive data belongs to), for a given multi-field data structure, the assigned probability is indicative of a binary determination, since the probability only corresponds to one particular question. As illustrated in the example, the context-based token classification module generates a probability of 0.76 (76%) for the "security info" data structure and a probability of 0.87 (87%) for the "user password" data structure.

Further, the probability per data structure is provided to post-processing module 240 that ranks the probabilities and identifies whether the data structure with the highest probability meets a probability threshold (0.70, as indicated in FIG. 4). Since the data structure with the highest probability (e.g., the "user password" data structure in the illustrated example) meets the probability threshold, module 240 generates a final masked result using the label "user password."

In the illustrated example, the final masked result is identical to the input text except that the identified sensitive information (e.g., the user's requested password "CrazyCat") is masked using the context-aware category label "[user password]" corresponding to one of the data structures in the set of data structures. This label allows someone reviewing the text (e.g., a customer support employee) to more meaningfully review the user's message, while still complying with the relevant data handling requirements.

Example Method

Figure 5:
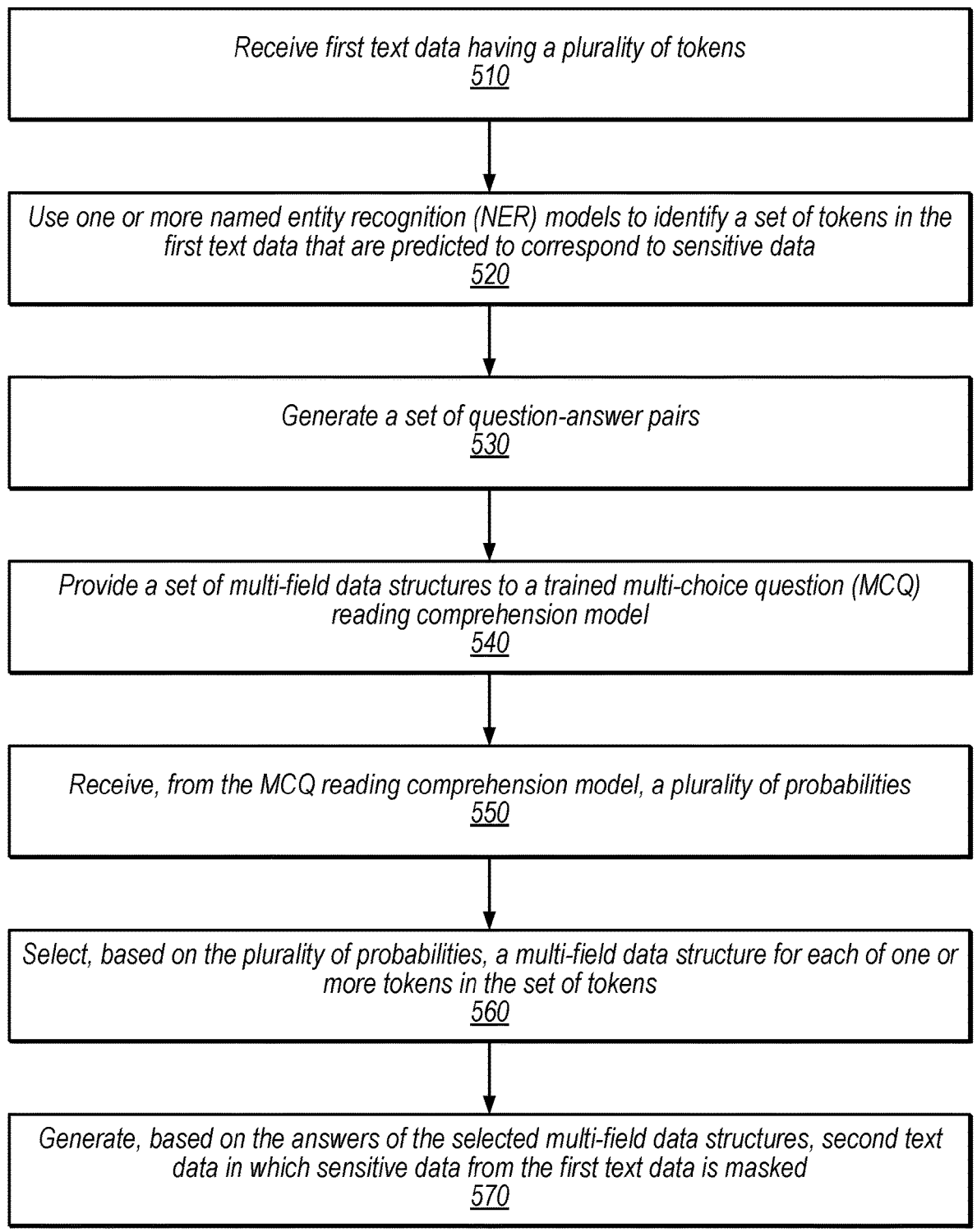
FIG. 5 is a flow diagram illustrating a method of one embodiment of text sanitization.

FIG. 5 is a flow diagram illustrating a method of one embodiment of text sanitization. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, a computer system (e.g., NER module 210) receives first text data (e.g., input text) having a plurality of tokens. In some embodiments, the first text data includes sensitive data that includes at least one of the following types of sensitive data: bank record data, credit card information, or health data. In some embodiments, the sensitive data may be associated with a user.

In some embodiments, the first text data is received from at least one of the following sources of text data: a customer service live chat, a voice transcript, or email.

At 520, in the illustrated embodiment, the computer system (e.g., NER module 210), uses one or more NER models to identify a set of tokens in the first text data that are predicted to correspond to sensitive data. In some embodiments, the set of tokens includes one or more alphanumeric tokens and one or more non-alphanumeric tokens.

In some embodiments, the one or more NER models are binary, indicating whether a given token in the set of tokens is sensitive or non-sensitive. In some embodiments, the computer system (e.g., NER module 210) uses a first NER model for the one or more alphanumeric tokens and a second, different NER model for the one or more non-alphanumeric tokens.

At 530, in the illustrated embodiment, the computer system (e.g., question-answer generation module 220) generates a set of question-answer pairs, where a given question-answer pair includes a question and a corresponding answer.

In some embodiments, the computer system (e.g., question-answer generation module 220) generates a set of questions in one of two ways: question templates or neural question generation.

In some embodiments, the computer system (e.g., question-answer generation module 220) generates corresponding answers for the set of question-answer pairs by enumerating a set of answers for the set of questions to generate the set of question-answer pairs.

At 540, in the illustrated embodiment, the computer system provides a set of multi-field data structures to a trained multi-choice question (MCQ) reading comprehension model. In some embodiments, the computer system uses a pre-trained language model to implement the MCQ reading comprehension model.

In some embodiments, a given multi-field data structure in the set of multi-field data structures is generated by the computer system (e.g., multi-field data structure concatenation module 310) by concatenating context data and a given question-answer pair from the set of question-answer pairs.

In some embodiments, the context data is generated from the first text data based on N number of tokens specified by a context threshold. In some embodiments, the context threshold specifies the number of tokens before and after a target token (or the number of surrounding tokens), in the set of tokens, that are to be extracted from the first text data to form the context data. Thus, in some embodiments, for a given one of the set of identified tokens, the context data includes a number N of surrounding tokens within the first text data. In some embodiments, the number N is a programmed value.

At 550, in the illustrated embodiment, the computer system (e.g., post-processing module 240) receives, from the MCQ reading comprehension model, a plurality of probabilities. In some embodiments, a given probability in the set of probabilities indicates the likelihood that a given multi-field data structure's answer matches the data structure's question, given surrounding context. Thus, even though the overall objective is a multi-class classification (i.e., determining which of multiple categories a given piece of sensitive data belongs to), for a given multi-field data structure, the probability is indicative of a binary determination for one particular question.

At 560, in the illustrated embodiment, the computer system selects, based on the plurality of probabilities, a multi-field data structure for each of one or more tokens in the set of tokens. In some embodiments, a selected multi-field data structure is usable to generate second text data (e.g., sanitized text).

In some embodiments, for a first one of the one or more tokens, the computer system (e.g., ranking module 360) ranks those plurality of probabilities corresponding to the first token. In some embodiments, the computer system (e.g., ranking module 360) selects the ranked multi-field data structure with the highest corresponding probability that exceeds a probability threshold.

At 570, in the illustrated embodiment, the computer system (e.g., masking module 370) generates, based on the answers of the selected multi-field data structures, second text data in which sensitive data from the first text data is masked.

In some embodiments, for a particular token of the one or more tokens, the computer system (e.g., masking module 370) uses the selected multi-field data structure to select an information category for the particular token and replaces the particular token with a text label corresponding to the selected information category in order to generate the second text data.

In some embodiments, for a second token in the set of tokens having a corresponding group of multi-field data structures, the computer system (e.g., ranking module 360) determines that none of the probabilities in the group of multi-field data structures for the second token exceed a probability threshold. In some embodiments, no multi-field data structure is selected for the second token and the computer system (e.g., masking module 370) generates second text data such that the second token appears unmasked.

In some embodiments, the computer system (e.g., masking module 370) masks sensitive data from the first text data with context-aware category information associated with the selected multi-field data structure. In some embodiments, the context-aware category information is generated based on the answer from the selected data structure; and may include indexing a table using the answer from the selected data structure to retrieve the category information.

The various techniques described herein may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, a system that implements the methods described with respect to any of the disclosed techniques is also contemplated.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for text sanitization, the method comprising:
    receiving, by a computer system, first text data having a plurality of tokens;
    using, by the computer system, one or more named entity recognition (NER) models to identify a set of tokens in the first text data that are predicted to correspond to sensitive data;
    generating, by the computer system, a set of question-answer pairs, a given question-answer pair having a question for a given token in the set of tokens and multiple answers identifying respective classifications corresponding to the given token;
    providing, by the computer system, a set of multi-field data structures to a trained multi-choice question (MCQ) reading comprehension model, wherein a given multi-field data structure includes a question-answer pair from the set of question-answer pairs and context information from the first text data;
    receiving, by the computer system from the MCQ reading comprehension model, a plurality of probabilities, a given probability corresponding to a particular multi-field data structure and indicating a relevance of the particular multi-field data structure's question-answer pair to the particular multi-field data structure's context;
    selecting, by the computing system based on the plurality of probabilities, a multi-field data structure for each of one or more tokens in the set of tokens; and
    generating, by the computing system based on the answers of the selected multi-field data structures, second text data in which sensitive data from the first text data is masked.

2. The method of claim 1, wherein, for a given one of the set of identified tokens, the context information includes a number N of surrounding tokens within the first text data.

3. The method of claim 1, wherein generating the second text data includes, for a particular token of the one or more tokens:
    using the selected multi-field data structure for the particular token to select an information category for the particular token; and replacing the particular token with a text label corresponding to the selected information category in order to generate the second text data.

4. The method of claim 1, wherein the set of tokens includes one or more alphanumeric tokens and one or more non-alphanumeric tokens; and
wherein the using one or more NER models includes using a first NER model for the one or more alphanumeric tokens and a second, different NER model for the one or more non-alphanumeric tokens.

5. The method of claim 1, further comprising, for a first one of the one or more tokens:
ranking those plurality of probabilities corresponding to the first token; and
wherein the selecting selects the ranked multi-field data structure with the highest corresponding probability that exceeds a probability threshold.

6. The method of claim 1, wherein the set of tokens includes a second token having a corresponding group of multi-field data structures, and wherein the method further comprises:
determining that none of the probabilities in the group of multi-field data structures for the second token exceed a probability threshold, wherein the determining causes:
no multi-field data structure to be selected for the second token; and
the generating to be performed such that the second token appears, unmasked, in the second text data.

7. The method of claim 1, wherein the sensitive data includes at least one of the following types of sensitive data:
bank record data;
credit card information; or
health data.

8. The method of claim 1, wherein the first text data is received from at least one of the following sources:
a customer service live chat;
a voice transcript; or
email.

9. A non-transitory computer-readable medium having instructions stored thereon that are executable by a computing device to perform operations comprising:
receiving first text data having a plurality of tokens;
using one or more named entity recognition (NER) models to identify a set of tokens in the first text data that are predicted to correspond to sensitive data;
generating a set of question-answer pairs, a given question-answer pair having a question about a given token in the set of tokens and multiple answers identifying respective classifications corresponding to the given token one of the tokens in the set of tokens;
providing a set of multi-field data structures to a pre-trained multi-choice question (MCQ) reading comprehension model, wherein a given multi-field data structure includes a question-answer pair from the set of question-answer pairs and corresponding context information from the first text data;
receiving a plurality of probabilities from the MCQ reading comprehension model, a given probability corresponding to a particular multi-field data structure and being indicative of a relevance of the particular multi-field data structure's question-answer pair to the particular multi-field data structure's context;
selecting, for each of one or more tokens in the set of tokens, a multi-field data structure; and generating, based on the selected multi-field data structures, second text data in which sensitive data from the first text data is masked.

10. The non-transitory computer-readable medium of claim 9, wherein the context information for a given token includes a predetermined number of surrounding tokens from the first text data.

11. The non-transitory computer-readable medium of claim 10, wherein the predetermined number is a programmed value.

12. The non-transitory computer-readable medium of claim 9, wherein the set of tokens includes one or more alphanumeric tokens and one or more non-alphanumeric tokens; and
wherein the using one or more NER models to identify a set of tokens in the first text data that are predicted to correspond to sensitive data includes using a first NER model for the one or more alphanumeric tokens and a second, different NER model for the one or more non-alphanumeric tokens.

13. The non-transitory computer-readable medium of claim 9, wherein the operations further comprise, for a first one of the one or more tokens:
ranking the plurality of probabilities corresponding to the first token; and
wherein the selecting selects the ranked multi-field data structure with the highest corresponding probability that exceeds a probability threshold.

14. The non-transitory computer-readable medium of claim 13, wherein the set of tokens includes a second token having a corresponding group of multi-field data structures, and wherein the operations further comprise:
determining that none of the probabilities in the group of multi-field data structures for the second token exceed a probability threshold, wherein the determining causes:
no multi-field data structure to be selected for the second token; and
the generating to be performed such that the second token appears, unmasked, in the second text data.

15. The non-transitory computer-readable medium of claim 9, wherein generating the second text data includes, for a particular one of the one or more tokens:
using the selected multi-field data structure for the particular token to select an information category for the particular token; and
replacing the particular token with a text label corresponding to the selected information category in order to generate the second text data.

16. A system, comprising:
a processor circuit;
a memory circuit including instructions that when executed by the processor circuit cause the system to perform operations including:
receiving, by a computer system, first text data having a plurality of tokens;
using, by the computer system, one or more machine learning models to identify a set of tokens in the first text data that are predicted to correspond to sensitive data;
generating, by the computer system, a set of multi-field data structures, wherein a given multi-field data structure is generated by including context information from the first text data with a question-answer pair from a set of question-answer pairs, a given question-answer pair including a question about a classification of a given token in the set of token and multiple answers identifying respective classifications corresponding to the given token;

providing, by the computer system, the set of multi-field data structures to a reading comprehension machine learning model;

receiving, by the computer system from the reading comprehension machine learning model, a plurality of probabilities, a given probability corresponding to a given multi-field data structure and indicating a relevance of the multi-field data structure's question-answer pair to the multi-field data structure's context;

selecting, by the computer system based on the plurality of probabilities, a multi-field data structure for each of one or more tokens in the set of tokens; and masking, by the computer system, based on the answers of the selected multi-field data structures, sensitive data in the first text data to generate second text data.

17. The system of claim 16, wherein the reading comprehension machine learning model is a multi-choice question (MCQ) reading comprehension model.

18. The system of claim 16, wherein the set of tokens includes one or more alphanumeric tokens and one or more non-alphanumeric tokens; and wherein the using one or more machine learning models to identify a set of tokens in the first text data that are predicted to correspond to sensitive data includes using a first machine learning model for the one or more alphanumeric tokens and a second, different machine learning model for the one or more non-alphanumeric tokens.

19. The system of claim 16, wherein the operations further comprise, for a first one of the one or more tokens:

ranking, by the computer system, the plurality of probabilities corresponding to the multi-field data structures for the first token; and wherein the selecting selects the ranked multi-field data structure with the highest corresponding probability that exceeds a probability threshold.

20. The system of claim 19, wherein the set of tokens includes a second token having a corresponding group of multi-field data structures, and wherein the operations further comprise:

determining that none of the probabilities in the group of multi-field data structures for the second token exceed a probability threshold, wherein the determining causes:

no multi-field data structure to be selected for the second token; and the generating to be performed such that the second token appears, unmasked, in the second text data.

* * * * *